(12) United States Patent
Fujimoto

(10) Patent No.: US 7,688,399 B2
(45) Date of Patent: Mar. 30, 2010

(54) IMAGE DISPLAY APPARATUS

(75) Inventor: Makoto Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 11/855,078

(22) Filed: Sep. 13, 2007

(65) Prior Publication Data

US 2008/0180596 A1     Jul. 31, 2008

(30) Foreign Application Priority Data

Sep. 14, 2006    (JP)   ............................. 2006-249254

(51) Int. Cl.
     *G02F 1/1335*      (2006.01)

(52) U.S. Cl. ................ 349/62; 349/11; 349/9; 359/13; 359/630; 359/631; 359/633; 359/636

(58) Field of Classification Search ............... 349/62; 359/630, 631, 633, 636
See application file for complete search history.

(56) References Cited

U.S. PATENT DOCUMENTS

| | | | | |
|---|---|---|---|---|
| 6,023,373 | A * | 2/2000 | Inoguchi et al. | 359/633 |
| 6,333,820 | B1 | 12/2001 | Hayakawa et al. | |
| 6,594,085 | B2 * | 7/2003 | Ohtaka et al. | 359/631 |
| 7,081,999 | B2 * | 7/2006 | Yamazaki | 359/630 |
| 2002/0034016 | A1 * | 3/2002 | Inoguchi et al. | 359/630 |
| 2003/0030912 | A1 * | 2/2003 | Gleckman et al. | 359/633 |
| 2003/0179423 | A1 * | 9/2003 | Endo et al. | 359/10 |

FOREIGN PATENT DOCUMENTS

| | | |
|---|---|---|
| JP | 11-125791 | 5/1999 |
| JP | 11-337863 | 12/1999 |
| JP | 2000-010041 | 1/2000 |
| JP | 2002-244076 | 8/2002 |

\* cited by examiner

*Primary Examiner*—David Nelms
*Assistant Examiner*—Thanh-Nhan P Nguyen
(74) *Attorney, Agent, or Firm*—Canon USA Inc IP Div

(57) ABSTRACT

An image display apparatus including a light source unit, a liquid crystal display panel, an illumination optical system leading light from the light source unit to the liquid crystal display panel, and a display optical system leading light from the liquid crystal display panel to an observer. The illumination optical system and the display optical system share an optical surface having dielectric multilayer films and being concave toward the liquid crystal display panel on a plane including a center ray corresponding to an angle of view. The optical surface reflects light from the light source unit for leading the light to the liquid crystal display panel while transmitting light reflected from the liquid crystal display panel. On the plane including the center ray, the brightness of the light-emitting surface of the light source unit is reduced toward the optical surface smaller than that in the remote from the optical surface.

4 Claims, 11 Drawing Sheets

MERIDIONAL SECTION

MERIDIONAL SECTION

DIELECTRIC HALF-MIRROR Rs×Tp

AL HALF-MIRROR P3 65°

IMAGE DISPLAY APPARATUS

BACKGROUND OF THE INVENTION

1. Field of the Invention

The present invention relates to an image display apparatus. The image display apparatus according to the present invention is suitable for a head-mount display (HMD) and a spectacle-type display, for example.

2. Description of the Related Art

Various head-mounted image observer systems (image display apparatuses) in that images displayed on an image display panel, such as a liquid crystal display panel, are observed as enlarged virtual images, so-called head-mount displays (HMDs), have been proposed.

Among them, an HMD including a reflective liquid crystal panel has been known (Japanese Patent Laid-Open No. H11-125791 (corresponding to U.S. Pat. No. 6,333,820), No. H11-337863 (corresponding to U.S. Pat. No. 6,023,373), No. 2000-010041, and No. 2002-244076 (corresponding to U.S. Pat. No. 7,081,999)).

In the HMD including a reflective liquid crystal panel, an observational light beam proceeds to an illumination light source, an illumination optical system, the reflective liquid crystal panel, a display optical system, and eyeballs, in that order.

Japanese Patent Laid-Open No. H11-125791, No. H11-337863, and No. 2000-010041 disclose an HMD having a free-form surface prism and the reflective liquid crystal panel combined with each other.

Japanese Patent Laid-Open No. 2002-244076 discloses an HMD including the reflective liquid crystal panel and a cylindrical curved surface as the illumination optical system for miniaturizing the entire apparatus so that the illuminance is increased by condensing the light from the light source with the cylindrical curved surface.

When the reflective liquid crystal panel is used as an image display apparatus, in order to miniaturize the entire apparatus, it is especially important to appropriately configure an illumination device for illuminating the liquid crystal display panel.

In order to achieve a small-sized illumination optical system, in Japanese Patent Laid-Open No. 2002-244076, for example, a half-mirror is included in the illumination optical system so that the illumination light is led to the reflective liquid crystal panel. Since the liquid crystal panel is a modulating device employing polarization, a metal with small difference in polarization characteristics, such as aluminum, is used for the half-mirror.

However, in the half-mirror made of aluminum, when the incident angle of light on the half-mirror surface is changed, the light availability is largely reduced.

Reduction in light availability requires the illumination light source to be further illuminative, so that the electric power availability is reduced, increasing the heat emission of the HMD itself.

Accordingly, in the image display apparatus employing the liquid crystal panel, it is important to appropriately configure the light source and the illumination optical system ranging from the light source to the liquid crystal panel.

SUMMARY OF THE INVENTION

The present invention is directed to an image display apparatus in that the loss in illumination light power is reduced to the utmost while the entire apparatus is reduced in size.

An image display apparatus according to an aspect of the present invention includes a light source unit; a liquid crystal display panel; an illumination optical system configured to lead the light from the light source unit to the liquid crystal display panel; and a display optical system configured to lead the light from the liquid crystal display panel to an observer, in which the illumination optical system and the display optical system share an optical surface having dielectric multilayer films laminated thereon and being concave toward the liquid crystal display panel on a plane including a center ray corresponding to an angle of view, the optical surface reflecting the light from the light source unit so as to lead the reflected light to the liquid crystal display panel while transmitting the light reflected from the liquid crystal display panel, and in which on the plane including the center ray corresponding to an angle of view, the brightness of the light-emitting surface of the light source unit is reduced toward the optical surface smaller than that in the remote from the optical surface.

Further features of the present invention will become apparent from the following description of exemplary embodiments with reference to the attached drawings.

DESCRIPTION OF THE EMBODIMENTS

Figure 1:
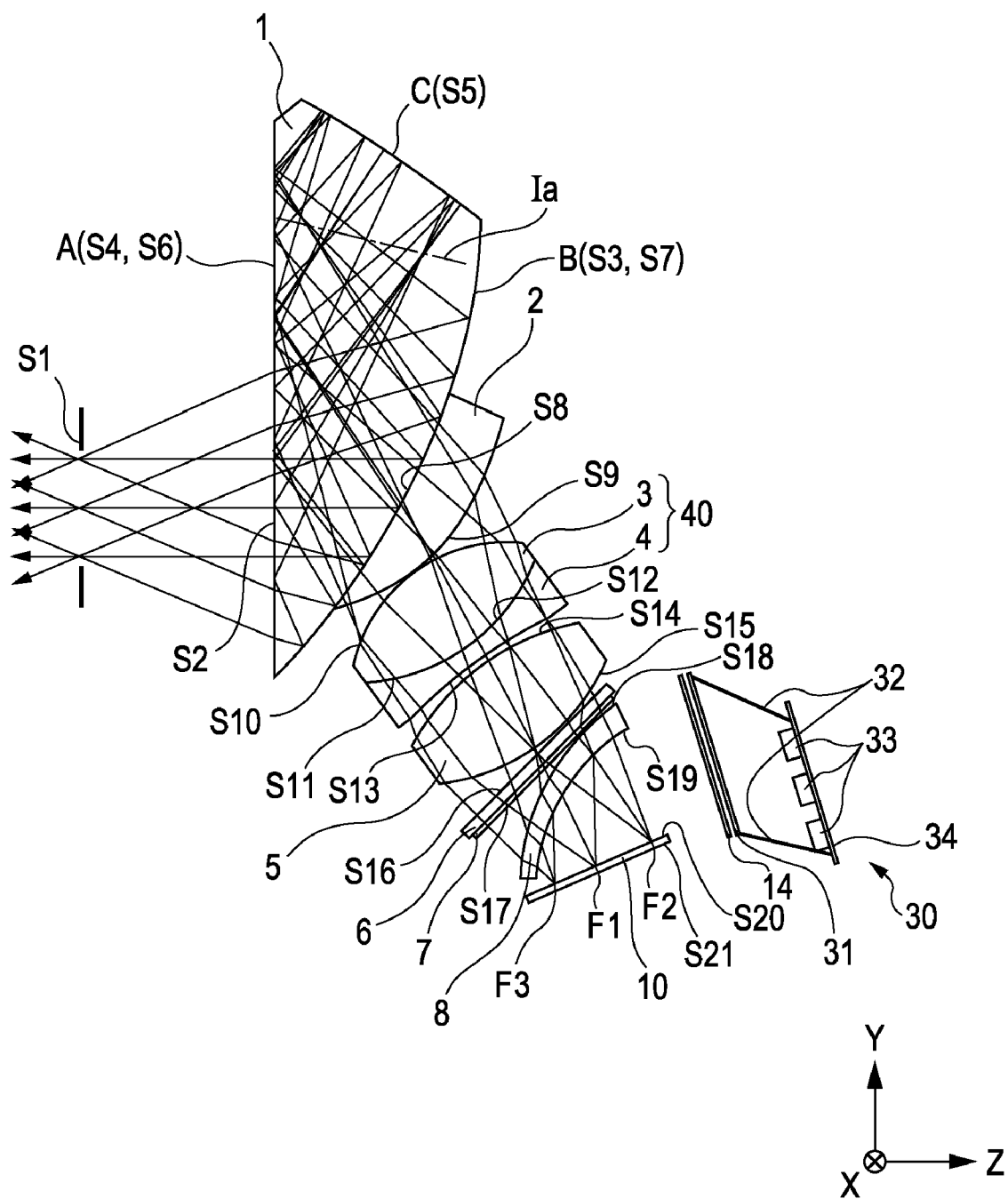
FIG. 1 is a schematic view of the essential part of an image display apparatus according to a first embodiment.

FIG. 1 is a schematic view of the essential part of an image display apparatus according to a first embodiment of the present invention. The image display apparatus according to the first embodiment is incorporated into a head-mount display.

Figure 2:
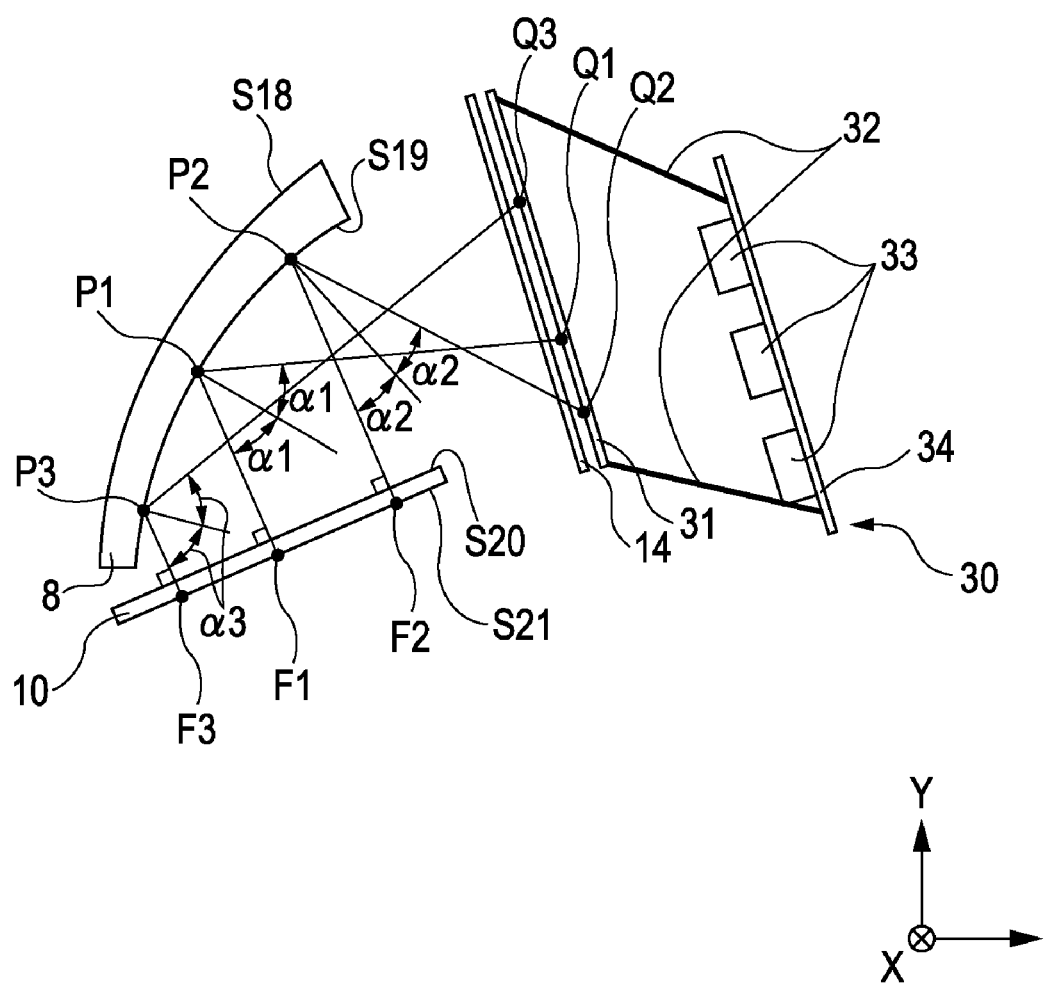
FIG. 2 is a schematic view of a light source unit and an illumination optical system according to the first embodiment.

FIG. 2 is an enlarged explanatory view of part of FIG. 1.

The optical data according to the first embodiment is shown in [Numerical Example 1].

Referring to FIG. 1, an optical element 1 is composed of a prism body having three or more optical surfaces on a transparent material with a refractive index of more than 1. The optical element 1 according to the embodiment includes an optical surface A, an optical surface B, and an optical surface C.

The optical surfaces A, B, and C are refracting surfaces and/or reflecting surfaces, both with curvatures. The optical surface A includes surfaces S2, S4, and S6 along an optical path. That is, the surfaces S2, S4, and S6 are the same surface. The optical surface B includes surfaces S3 and S7 along the optical path. That is, the surfaces S3 and S7 are the same surface. The optical surface C includes a surface S5. The optical element 1 according to the embodiment is composed of the three optical surfaces A, B, and C; alternatively, it may be composed of three or more optical surfaces. The optical surfaces A, B, and C will also be referred as the surfaces A, B, and C below.

An optical element 2 is composed of a prism body having two optical surfaces S8 and S9 on a transparent material with a refractive index of 1 or more.

The surface B (S7) of the prism body 1 and the optical surface S8 of the optical element 2 are bonded together.

An optical element (lens) 3 is composed of refracting surfaces S10 and S11, and an optical element (lens) 4 is composed of refracting surfaces S12 and S13. The surface S11 of the optical element 3 and the surface S12 of the optical element 4 are bonded together so as to form a bonded optical element 40.

An optical element 5 is composed of refracting surfaces S14 and S15, and a flat plate 6 includes flat surfaces S16 and S17.

A polarizer 7 is bonded on the flat plate 6, and a cylindrical lens 8 includes a surface (optical surface) S18 and a surface (optical surface) S19. The surfaces S18 and S19 are eccentric rotational asymmetric surfaces. The surface S19 constituting the cylindrical lens 8 is a dual purpose surface for transmission and reflection (half-mirror) made of multi-layered dielectric films.

A reflection liquid crystal display panel 10 is for displaying images. A member arranged between surfaces S20 and S21 corresponds to a cover glass for the liquid crystal display panel 10. The surface S21 is an image display surface of the liquid crystal display panel 10.

A light source unit 30 includes a diffusing plate 31, an LED 33, and an LED substrate 34. The diffusing plate 31 is arranged to oppose the cylindrical lens 8 for functioning as a light-emitting surface of the light source unit 30.

According to the embodiment, the diffusing plate 31 may be laminated with a DEF (direct exposure film) for increasing the brightness by optimizing diffusing characteristics and a DBEF (dual brightness enhancement film) for increasing the brightness by making only the necessary polarized light transmit it.

An exit pupil S1 of the display optical system is a position where an eyeball of an observer is located.

The entire surfaces of the members 1, 2, and 5 other than the bonded optical element 40 and the cylindrical lens 8 are shaped in a plane symmetry about only the plane of the figure (yz section).

The light emitted from the light source unit 30 passes through a polarizer 14 and becomes linearly polarized light, and it is reflected by the surface S19 of the cylindrical lens 8 to proceed toward the liquid crystal display panel 10.

The surface S19 herein forms the illumination optical system leading the light from the light source unit 30 to the liquid crystal display panel 10.

The light reflected by the surface S19 obliquely enters the liquid crystal display panel 10, and the light reflected by the liquid crystal display panel 10 in an oblique direction enters the surface S19 of the cylindrical lens 8 again so as to emit from the surface S18.

Then, it passes through the polarizer 7; it enters the surface S17 of the flat plate 6 so as to emit from the surface S16 for entering the optical element 5.

According to the embodiment, the light flux that is reflected by the surface S19 of the cylindrical lens 8 after passing through the polarizer 14 is the S-polarized light, i.e., a light flux having a polarizing direction parallel to the X-direction.

The light flux that is modulated (optically rotated) and reflected by the liquid crystal display panel 10 so as to enter the surface S19 of the cylindrical lens 8 so that it is emitted from the surface S18 so as to transmit the polarizer 7 is the P-polarized light, i.e., a light flux having a polarizing direction perpendicular to the X-direction.

The polarizer 7 cuts off the light flux that is reflected by the liquid crystal display device without being modulated to leave it as the S-polarized light so as to prevent the eyeball (the exit pupil S1) from being penetrated by ghost light.

The light incident in the surface S15 of the optical element 5 is emitted from the surface S13 so as to enter the optical element 4 from the surface S13. Then, it passes through the surface S14 of the bonded optical element 4 and the surface S11 of the optical element 3 so as to proceed toward the optical element 2 from the surface S10.

The light incident in the surface S9 of the optical element 2 passes through the surface S8 of the bonded optical element 2 and the surface S7 of the optical element 1 so as to enter the optical element 1. The light incident in the optical element 1 from the surface B (the surface S7) is led to the surface C (the surface S5) after being reflected by the surface A (the surface S6).

The light incident in the surface C (the surface S5) is reflected in an approximately opposite direction in return (will be described later) to proceed in an opposite direction to that of the light before the reflection.

The light reflected by the surface C (the surface S5) is again reflected by the surface A (the surface S4) and is again reflected by the surface B (the surface S3) so as to proceed toward the exit pupil S1 on the observing side from the surface A (the surface S2) of the prism body 1.

At this time, an intermediate image plane (intermediate images) Ia of the images displayed on the image display surface S21 is formed in the optical element 1.

According to the embodiment, the intermediate images Ia are formed between the reflection on the surface S and the reflection on the surface S5 after passing through the surface S7; however, the intermediate images Ia are not necessarily formed therebetween.

The surfaces (the surface S5, the surface S4, the surface S3, and the surface S2) contributing to the light flux from the reflection on the surface S4 subsequent to the intermediate images Ia to the emission from the surface S2 correspond to an eyepiece optical system.

The parts (the surface S7 and the surface S6) other than the optical element 1 in the optical element 1 and an optical system (optical elements 2 to 8) arranged between the optical element 1 and the cover glasses (S20 and S21) of the liquid crystal display panel 10 correspond to a relay optical system.

The display optical system includes the relay optical system and the eyepiece optical system.

The surface S3, when it functions as a final reflection surface, is a concave mirror having very strong refractive power to the surface S2 functioning as an emergent surface.

Since it is difficult to completely correct aberration in the region of the eyepiece optical system, in the region of the relay optical system, the intermediate images are formed so as to prepare the intermediate image plane Ia for canceling the aberration in the eyepiece optical system. Specifically, the intermediate images on the intermediate image plane Ia are formed to have appropriate curvature and astigmatic differences in accordance with the generation of curvature of field and astigmatism in the region of the eyepiece optical system so as to cancel them.

Thereby, the image quality in the final image observation is improved.

The reflection on the surface S4 is the internal total reflection in the optical element 1 for reducing the light power loss. At least in the region where shared by the emitted light flux from the surface S2 and the reflected light flux on the surface S4, the reflected light flux is to be the internal total reflection.

Thereby, in comparison with the case where the entire reflected light flux is to be the internal total reflection, the degree of freedom in design is increased while securing the same extent of the brightness.

In the reflection region on the surface S4 where the internal total reflection is not performed, the reflection is yielded due to a reflection film (Al or Ag, etc.). Also, the reflection on the surface S5 is yielded due to a reflection film (Al or Ag, etc.).

In the optical element 1, the light is transmitted through the surface B(S7), the surface A(S6), the surface C(S5), the surface A(S4), the surface B(S3), and the surface A(S2) in that order.

It is understood that the light follows the light path reversely until the final reflection surface B since a turn in the reflection on the surface C. That is, the forward optical path is followed by the surface B(S7), the surface A(S6), and the surface C(S5) in that order from the reflection on the surface C.

The reverse optical path is formed by the surface C(S5), the surface A(S4), and the surface B(S3) in that order.

The surface like the surface C having a turning-back reflection function, which switches the path from the forward to the reverse, is called "a turning-back surface" as mentioned above.

In such a manner, an optical path ranging along a plurality of eccentric reflection surfaces A, B, and C is turned back so that forward and reverse paths almost overlap with each other so as to accommodate a long optical path length within the small-sized optical device 1. Thereby, the entire display optical system is miniaturized.

A conventional system not corresponding to the eccentric system is defined by a coordinate system standardizing each surface vertex.

According to the embodiment, the Z-axis is defined by the axis passing through the center of the exit pupil S1 and perpendicular to the exit pupil S1, and the Z-axis is to be an optical axis. The axis perpendicular to the Z-axis is to be the Y-axis, and the axis perpendicular to the Z-axis and the Y-axis is to be the X-axis.

The YZ-section becomes a conventional meridional section, and the XZ-section becomes a sagittal section.

Since the first embodiment is the eccentric system, a local meridional section and a local sagittal section are newly defined in accordance with the eccentric system.

The local meridional section is defined by a surface including the incident ray and the emitted ray of the center ray corresponding to an angle of view at the hit point (incident position) of each surface by the a center ray corresponding to an angle of view. That is, the local meridional section is the plane including the optical path of the center ray corresponding to an angle of view. The center ray corresponding to an angle of view is emitted from the position corresponding to the center of the virtual images of the liquid crystal display panel 10 so as to perpendicularly enter the center of the exit pupil S1.

The local sagittal section is defined by the plane including the hit point, perpendicular to the local meridional section, and parallel to the sagittal section of the coordinate system of each surface vertex (ordinary sagittal section).

The curvature of the center ray corresponding to an angle of view in the vicinity of the hit point of each surface is calculated, so that the curvature radius of the center ray corresponding to an angle of view of each surface in the local meridional section is defined by ry, and the curvature radius in the local sagittal section is defined rx.

The analyses of the optical data in table 1 will be described below.

The item "SURF" on the most left expresses the surface number of the passing order of the light flux from the exit pupil S1.

The items X, Y, Z, and A use the center of the first surface S1 as an original point (0, 0, 0).

In the coordinate system of the Y-axis, the Z-axis, and the X-axis defined by the inner direction perpendicular to the plane of the figure, the position of each surface vertex is (X, Y, Z), the angle of rotation about the X-axis is a (unit: degree) when the counterclockwise direction in the drawing is defined by the positive direction.

The item "typ" expresses the kind of the surface shape. In the item "typ", "SPH" is a sphere; "FFS" a rotational asymmetry surface; and "CTY" a cylindrical lens surface having refractive power only to the meridional section.

The bonded surfaces S7 and S8 are separated; the bonded surfaces S11 and S12 are unified for convenience sake.

The rotational asymmetry surface according to the embodiment follows the FFS equation below.

The item R expresses the curvature radius; regarding to the cylindrical lens surface, the value of the sagittal section curvature radius "ry" is designated.

FFS:

$$z=(1/R)*(x2+y2)/(1+(1-(1+k)*(1/R)2*(x2+y2))(½))+ \\ c2+c4*y+c5*(x2-y2)+c6*(-1+2*x2+2*y2)+c10* \\ (-2*y+3*x2*y+3*y3)+c11*(3*x2*y-y3)+c12* \\ (x4-6*x2*y2+y4)+c13*(-3*x2+4*x4+3*y2- \\ 4*y4)+c14*(1-6*x2+6*x4-6*y2+12*x2*y2+ \\ 6*y4)+c20*(3*y-12*x2*y+10*x4*y-12*y3+ \\ 20*x2*y3+10*y5)+c21*(-12*x2*y+15*x4*y+ \\ 4*y3+10*x2*y3-5*y5)+c22*(5*x4*y- \\ 10*x2*y3+y5)+c23*(x6-15*x4*y2+15*x2*y4- \\ y6)+c24*(-5*x4+6*x6+30*x2*y2-30*x4*y2- \\ 5*y4-30*x2*y4+6*y6)+c25*(6*x2-20*x4+ \\ 15*x6-6*y2+15*x4*y2+20*y4-15*x2*y4- \\ 15*y6)+c26*(-1+12*x2-30*x4+20*x6+12*y2- \\ 60*x2*y2+60*x4*y2-30*y4+60*x2*y4+20* \\ y6)+\ldots$$

The numbers written by the side of "FFS" in the column "typ" show that the shape of the surface is a rotational asymmetry surface corresponding to the aspheric surface factors k and c listed in the lower portion of the table; however, the value of c not listed is zero.

Characters Nd and vd denote the refractive index and the Abbe number of the material of the surface on and after in the d-ray wavelength, respectively. The change in sign of the refractive index N indicates the light reflection by the surface. When the material is air, only the refractive index Nd is indicated as 1.0000, and the Abbe number is omitted.

The light ray passing through the Z-axis of the exit pupil S1 from the center of the exit pupil S1 is defined as a center ray corresponding to an angle of view.

The dimension in length of the below-mentioned numerical example is to be mm. At this time, the size of images is about 18 mm×14 mm so as to form a display optical system that displays the images with a horizontal field angle of 60° at infinity in the Z-direction.

The pupil diameter is to be 14 mm for any observer can observe the horizontal field angle of 60°.

Numerical Example 1

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 9.365 | 21.886 | −0.529 | −284.2114 | FFS1 | 1.5300 | 55.8 |
| 3 | 0.000 | −2.638 | 34.455 | −31.052 | −72.0536 | FFS2 | −1.5300 | 55.8 |
| 4 | 0.000 | 9.365 | 21.886 | −0.529 | −284.2114 | FFS1 | 1.5300 | 55.8 |
| 5 | 0.000 | 30.738 | 47.306 | 48.060 | −189.3367 | FFS3 | −1.5300 | 55.8 |
| 6 | 0.000 | 9.365 | 21.886 | −0.529 | −284.2114 | FFS1 | 1.5300 | 55.8 |
| 7 | 0.000 | −2.638 | 34.455 | −31.052 | −72.0536 | FFS2 | 1.5300 | 55.8 |
| 8 | 0.000 | −2.638 | 34.455 | −31.052 | −72.0536 | FFS2 | 1.5300 | 55.8 |
| 9 | 0.000 | −5.791 | 39.117 | −46.389 | −56.9404 | FFS4 | 1.0000 | |
| 10 | 0.000 | −7.538 | 37.525 | −53.721 | 18.2091 | SPH | 1.4875 | 70.2 |
| 11 | 0.000 | −16.105 | 43.813 | −53.721 | −21.5267 | SPH | 1.7618 | 26.5 |
| 12 | 0.000 | −17.556 | 44.878 | −53.721 | 66.0282 | SPH | 1.0000 | |
| 13 | 0.000 | −18.692 | 44.573 | −50.460 | 20.6510 | FFS5 | 1.5300 | 55.8 |
| 14 | 0.000 | −32.859 | 25.439 | −88.990 | −118.4382 | FFS6 | 1.0000 | |
| 15 | 0.000 | −49.433 | 29.812 | −45.448 | ∞ | SPH | 1.5230 | 58.6 |
| 16 | 0.000 | −50.288 | 30.654 | −45.448 | ∞ | SPH | 1.0000 | |
| 17 | 0.000 | −32.898 | 51.561 | −24.427 | 25.6080 | CYL | 1.7618 | 26.5 |
| 18 | 0.000 | −30.463 | 55.740 | −38.300 | 21.8260 | CYL | 1.0000 | |
| 19 | 0.000 | −38.215 | 64.167 | −66.742 | ∞ | SPH | 1.5500 | 52.0 |
| 20 | 0.000 | −38.858 | 64.443 | −66.742 | ∞ | SPH | 1.0000 | |
| 21 | 0.000 | −38.858 | 64.443 | −66.742 | 0.0000 | SPH | 1.0000 | 0.0 |

FFS1 c1: 4.7708e+001  c5: −2.2635e−003  c6: −2.6964e−004  c10: −3.5045e−006
c11: −1.8961e−005  c12: −2.5872e−007  c13: −3.5080e−007  c14: −1.8809e−007
c20: −8.5708e−010  c21: −5.5035e−010  c22: −4.8677e−010  c23: 1.7886e−011
c24: 2.5426e−011  c25: 1.2297e−011  c26: 6.2276e−012

FFS2 c1: −8.0283e−001  c5: −1.3225e−003  c6: −3.2740e−004  c10: −1.0438e−005
c11: −4.7937e−007  c12: −5.0068e−008  c13: −6.2302e−008  c14: 4.5234e−008
c20: 1.9842e−009  c21: −5.0837e−010  c22: 1.1409e−009  c23: 1.8477e−011
c24: −1.7819e−011  c25: 1.2831e−011  c26: −2.0655e−011

FFS3 c1: 2.6924e+001  c5: 2.4531e−004  c6: −1.2389e−003  c10: −4.7294e−005
c11: 3.6501e−005  c12: 2.1833e−006  c13: −2.0621e−006  c14: 1.3400e−006
c20: −3.4331e−008  c21: 2.1762e−008  c22: −5.5534e−009  c23: −2.7291e−010
c24: −2.2240e−010  c25: −2.8204e−010  c26: 2.0643e−011

FFS4 c1: −2.0112e+000  c5: −1.1439e−003  c6: −7.0182e−003  c10: 6.6323e−005
c11: 3.7827e−005  c12: −3.0764e−007  c13: −1.2255e−007  c14: 2.8074e−007
c20: −4.8304e−008  c21: −6.8627e−009  c22: 1.4540e−008  c23: 1.9275e−010
c24: −2.0887e−010  c25: −6.5050e−010  c26: 1.3565e−010

FFS5 c1: 8.3170e−001  c5: 2.2565e−003  c6: −1.7932e−003  c10: 4.9769e−005
c11: 5.8833e−005  c12: −1.8053e−006  c13: 3.0888e−007  c14: −2.4892e−006
c20: −1.1149e−008  c21: −5.0541e−008  c22: 3.6852e−008  c23: 1.3332e−009
c24: −1.1902e−009  c25: −7.4560e−011  c26: −9.7807e−009

FFS6 c1: 5.0873e−001  c5: 1.7979e−003  c6: 1.0845e−003  c10: −4.0100e−005
c11: −2.0713e−004  c12: 3.9779e−006  c13: 1.4457e−006  c14: −2.9702e−007
c20: −5.7229e−009  c21: 2.9933e−008  c22: −3.2629e−008  c23: −5.6700e−011
c24: −1.7802e−010  c25: −2.0885e−010  c26: −3.8998e−011

As shown in FIG. 2, the center position of the liquid crystal display panel 10 on the local meridional section (the yz-plane) is designated as F1. In the most peripheral images of the liquid crystal display panel 10, the image height on the liquid crystal display panel 10 remotest from the position where light passes through the optical surface S19 is to be F2. Also, the image height on the liquid crystal display panel 10 closest from the position where light passes through the optical surface S19 is to be F3.

As shown in FIG. 2, let points P1, P2, and P3 denote the feet of perpendicular lines to the liquid crystal display panel 10 dropped from the image heights F1, F2, and F3 and meeting the optical surface S19, respectively.

Let points Q1, Q2, and Q3 denote the feet of specular reflection lines on the optical surface S19 of lines F1P1, F2P2, and F3P3 meeting the diffusing surface of the diffusing plate 31, respectively. Also, let reflection angles α1, α2, and α3 denote the angles of the regular reflection lines on the optical surface S19 of the lines F1P1, F2P2, and F3P3, respectively.

As apparent from FIG. 2, the optical surface S19 is arranged such that its portion close to the diffusing plate 31 (P2) is remote from the liquid crystal display panel 10 in comparison with its portion remote from the diffusing plate 31 (P3).

The optical surface S19 has a curvature being concave toward the image display surface S21 (the liquid crystal display panel), so that the relationship is established:

$$\alpha 1 < \alpha 2 < \alpha 3 \quad (1).$$

Figure 3:
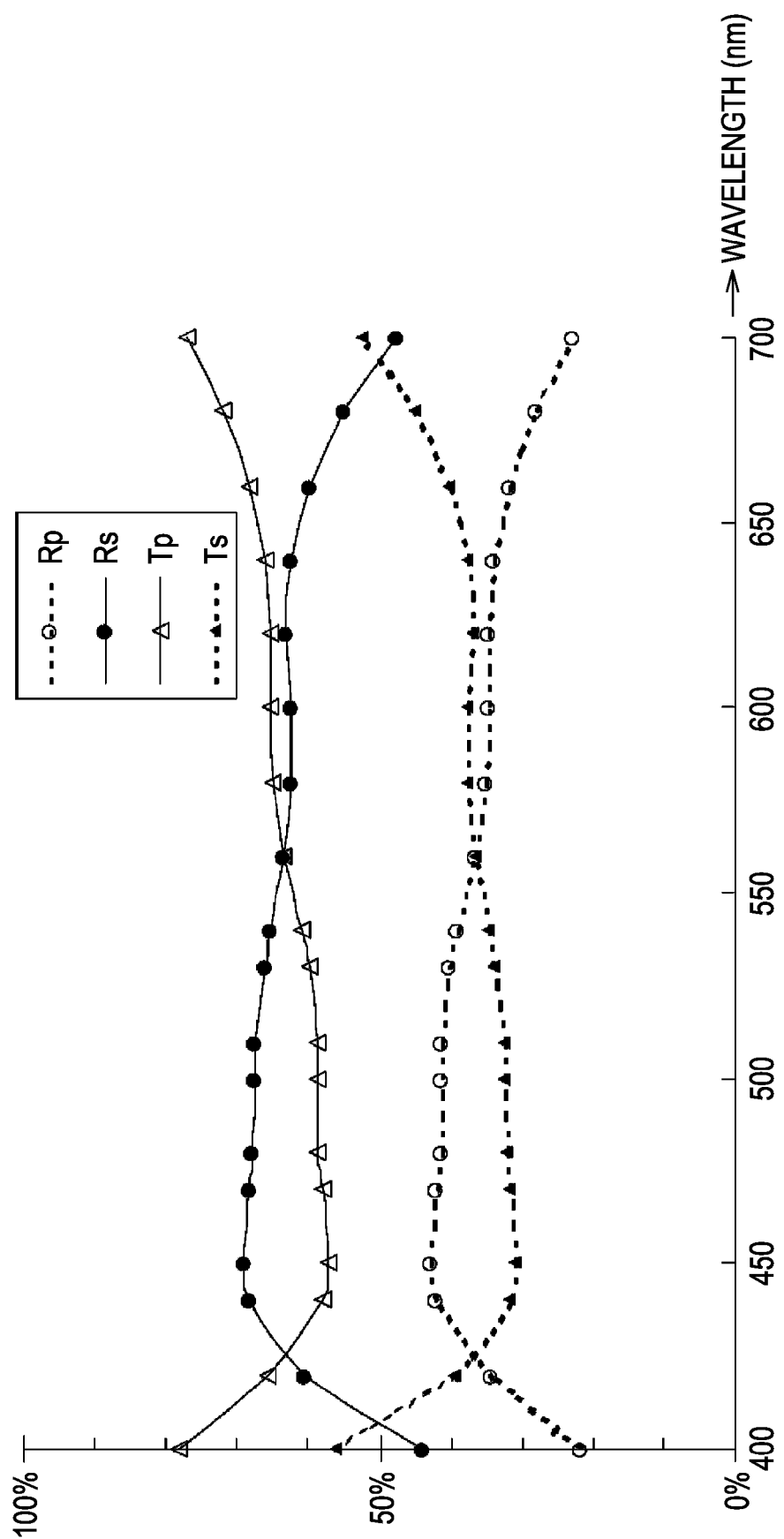
FIG. 3 shows the wavelength characteristic of a dielectric half-mirror at a position P1.
Figure 4:
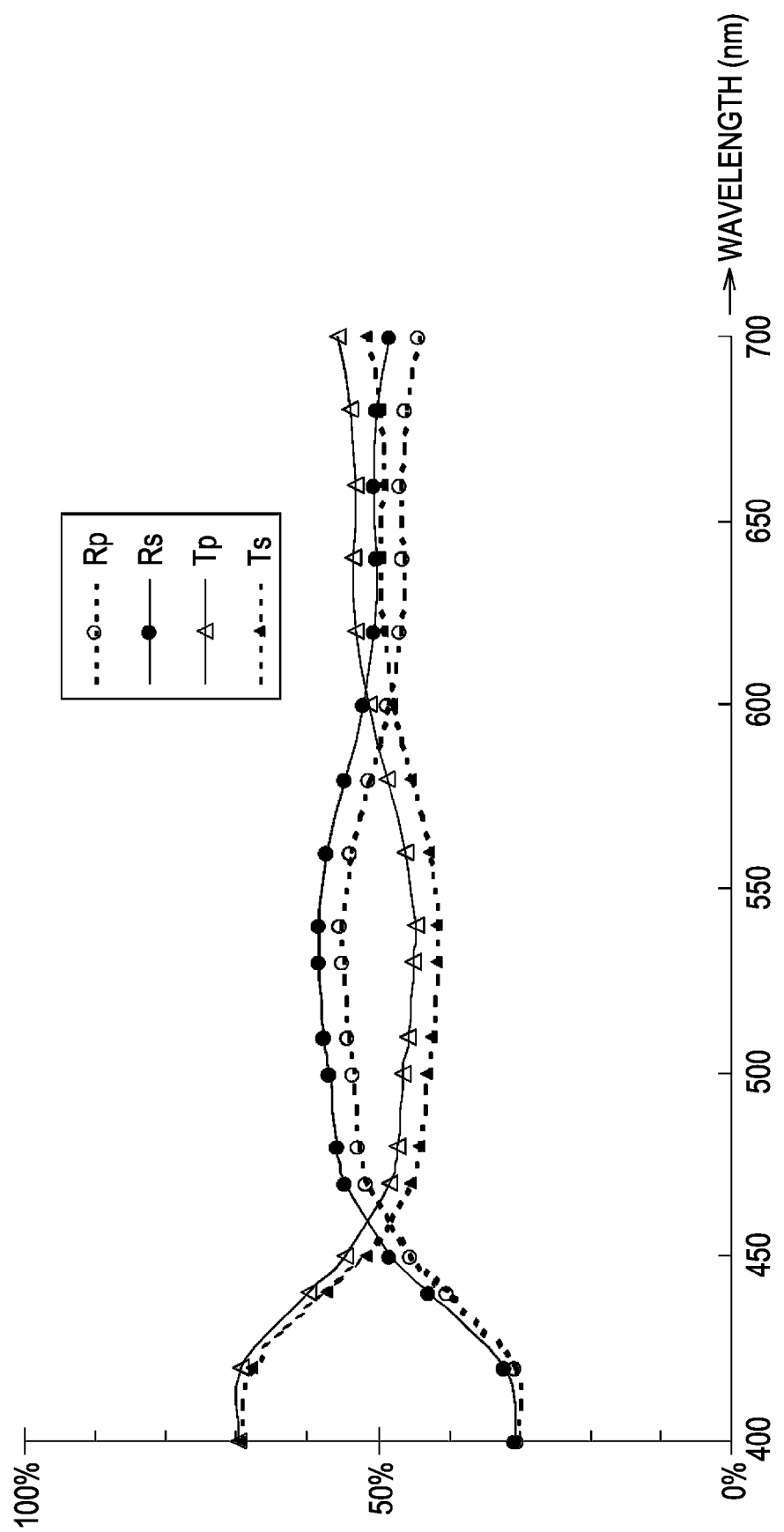
FIG. 4 shows the wavelength characteristic of the dielectric half-mirror at a position P2.
Figure 5:
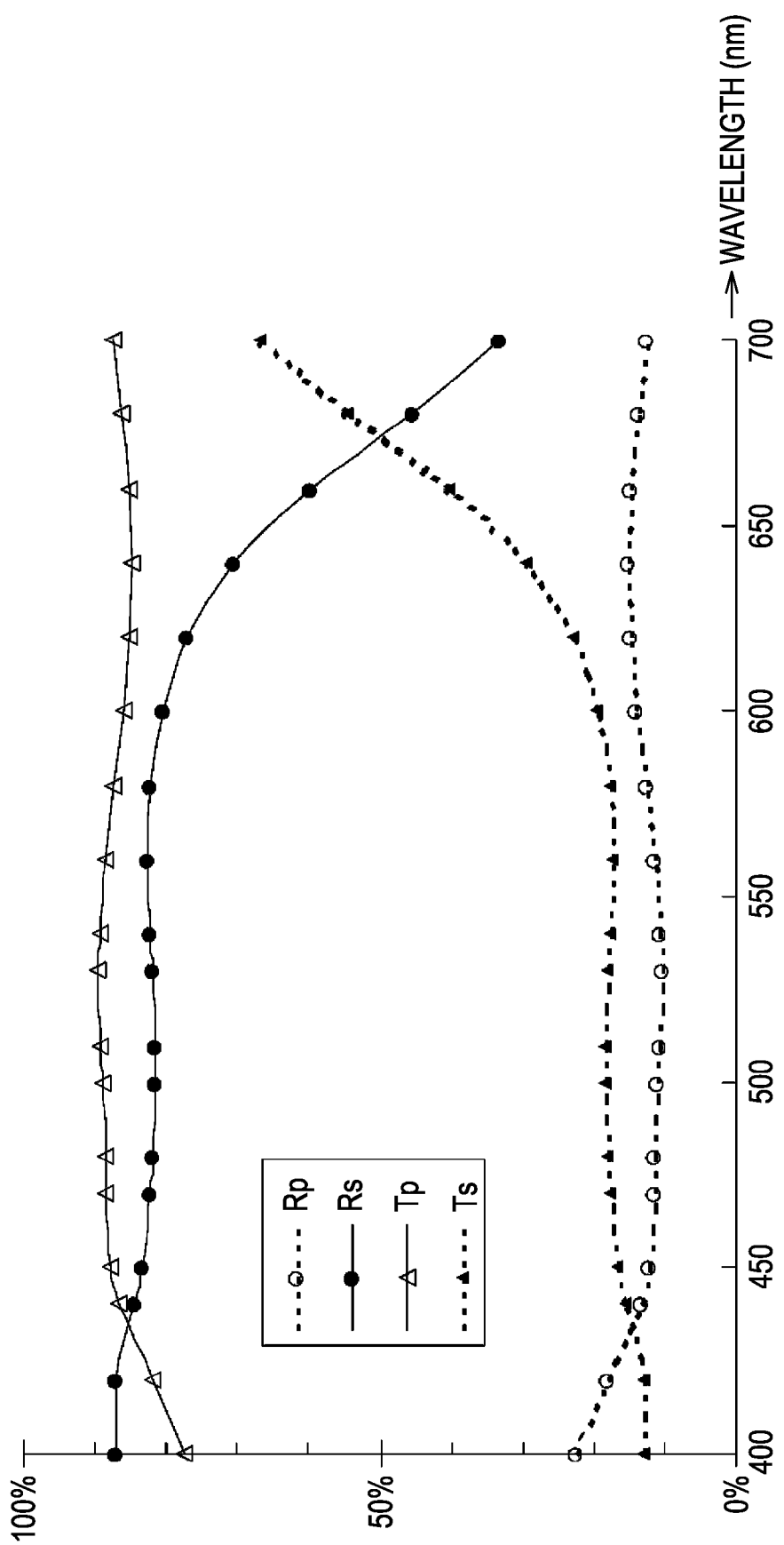
FIG. 5 shows the wavelength characteristic of the dielectric half-mirror at a position P3.

FIGS. 3 to 5 show examples of the reflectances Rp and Rs and the transmittances Tp and Ts of the dielectric half-mirror at incident angles α1 (40°), α2 (15°), and α3 (65°) of the light at the positions P1, P2, and P3 on the optical surface S19, respectively.

Figure 6:
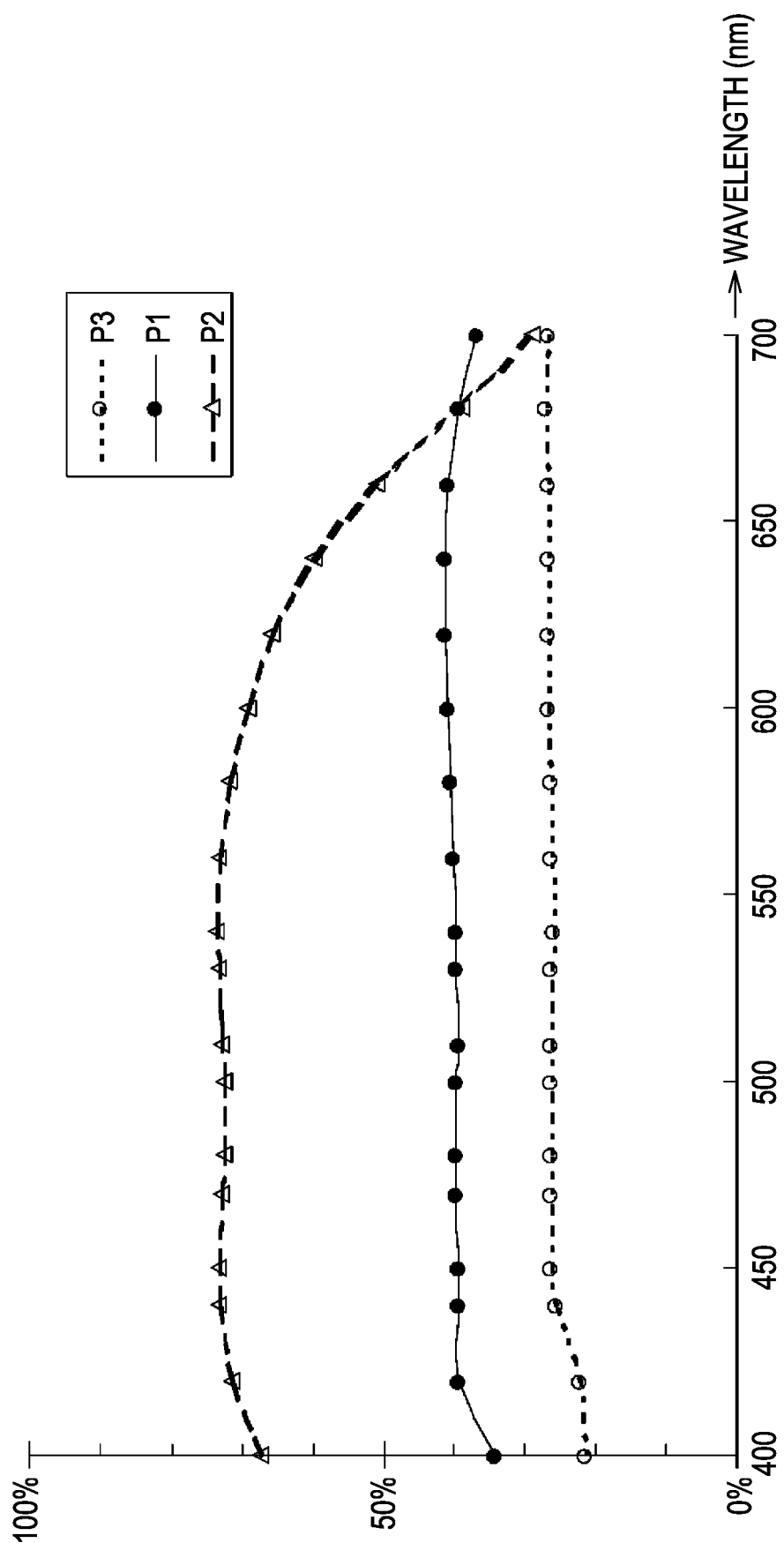
FIG. 6 shows the wavelength characteristic of a dielectric half-mirror Rs×Tp.

FIG. 6 shows wavelength characteristics of the product Rs×Tp of the reflectance Rs of the S-polarized light and the transmittance Tp of the P-polarized light at the positions P1, P2, and P3.

For reference, the wavelength characteristics when the metallic half-mirror is made of the optical surface S19 of the cylindrical lens 8 are shown in FIGS. 7 to 10. Aluminum is used as the metal.

Figure 7:
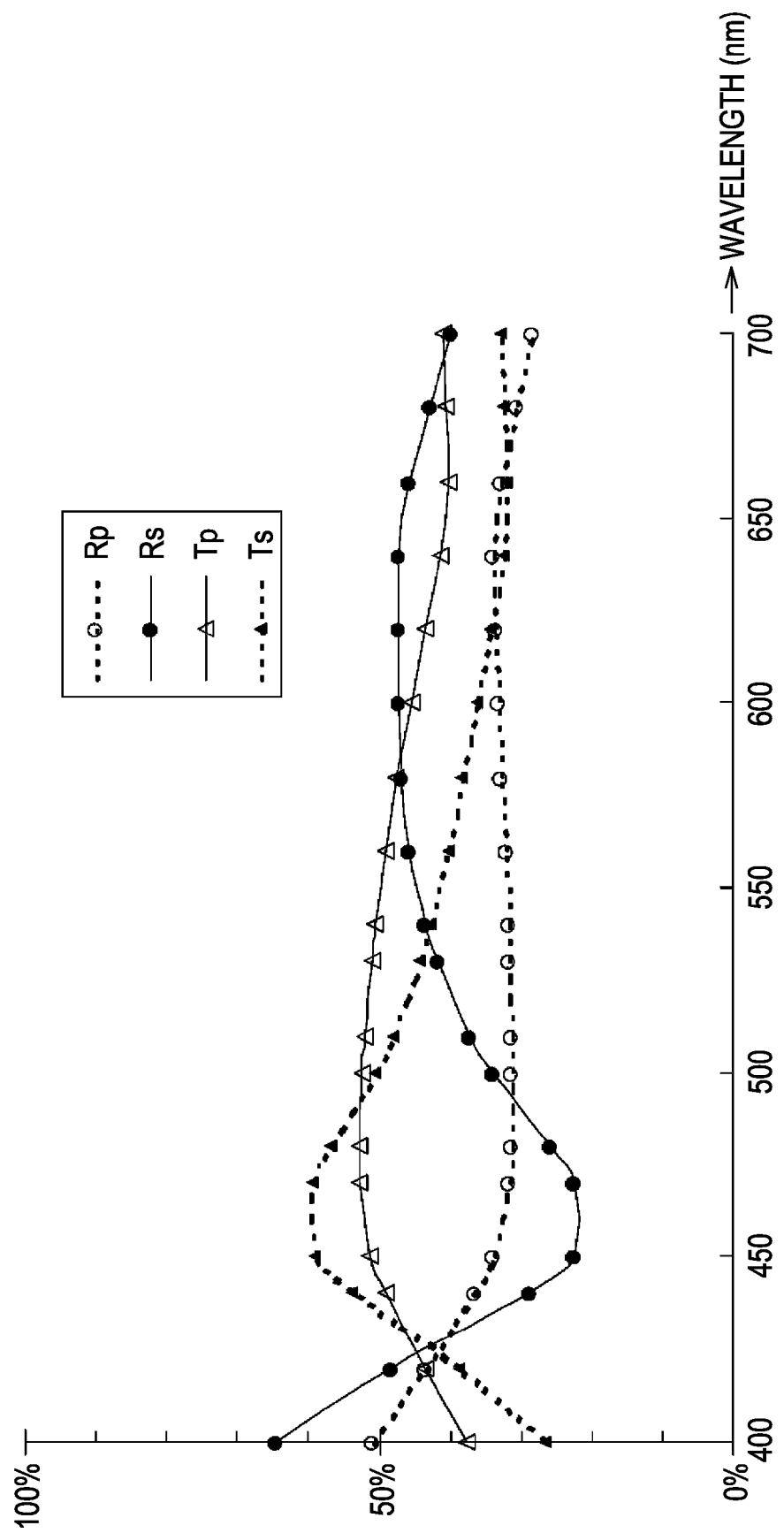
FIG. 7 shows the wavelength characteristic of a metallic half-mirror at the position P1.
Figure 8:
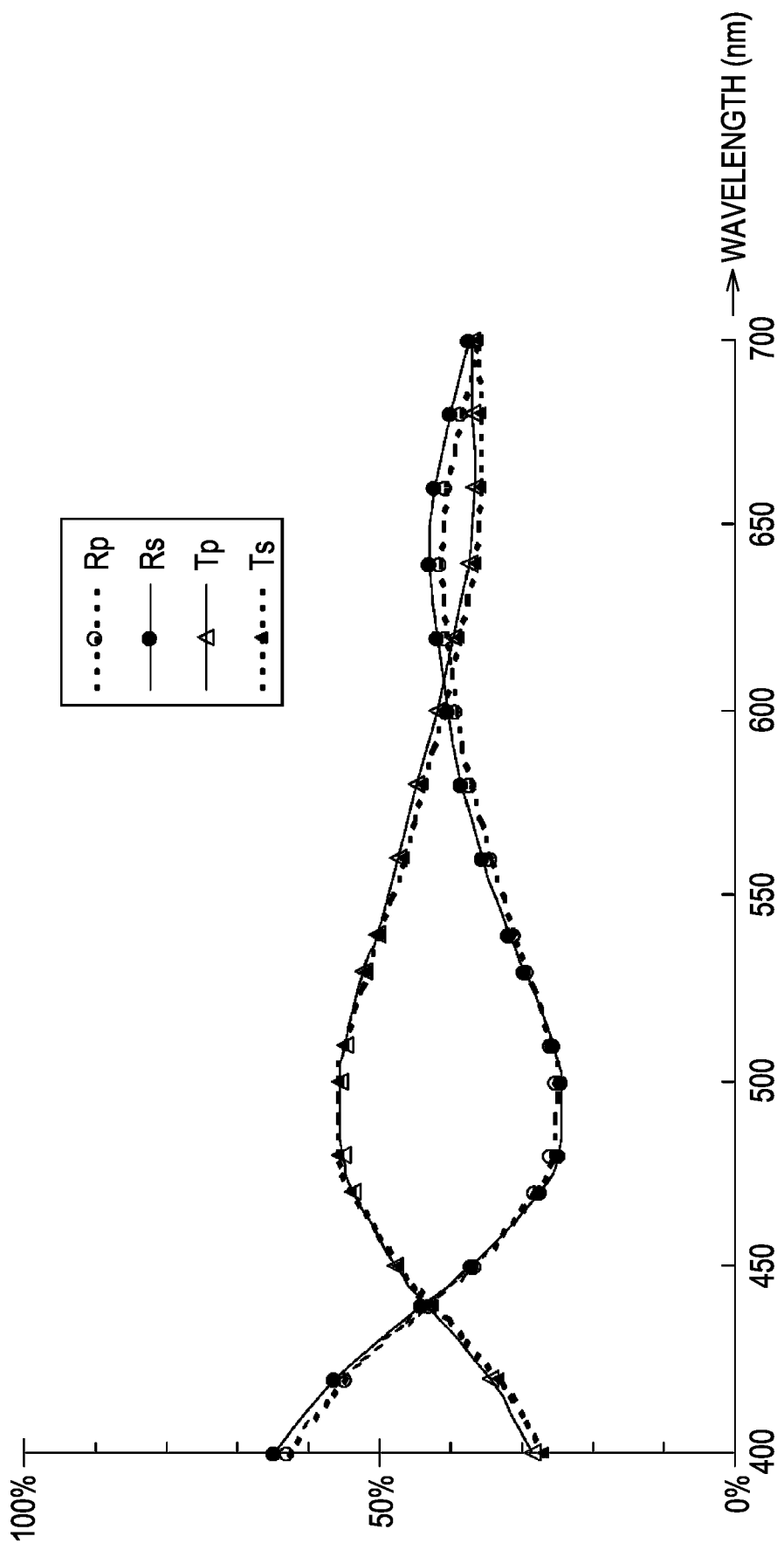
FIG. 8 shows the wavelength characteristic of the metallic half-mirror at the position P2.
Figure 9:
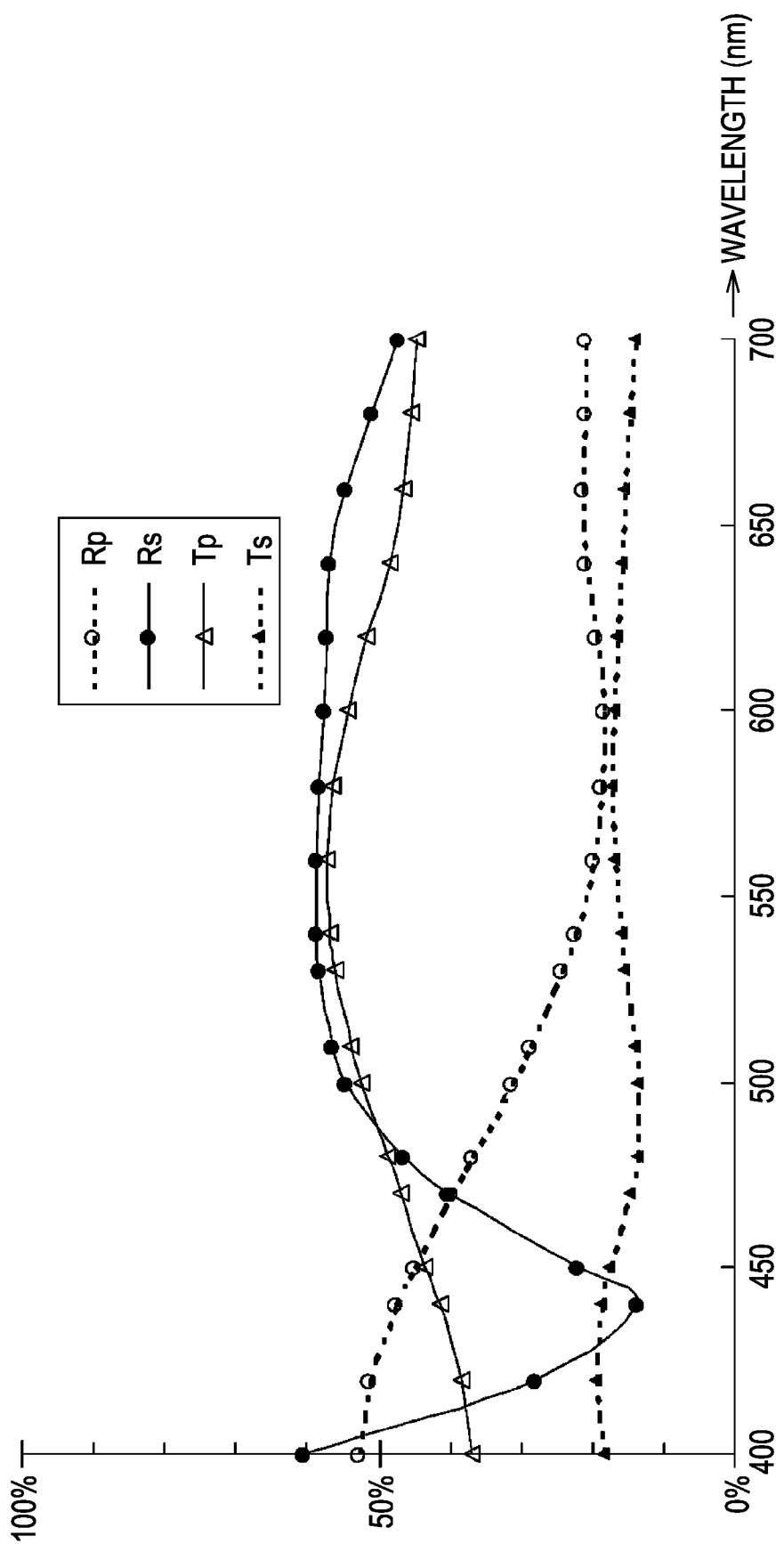
FIG. 9 shows the wavelength characteristic of the metallic half-mirror at the position P3.

FIGS. 7 to 9 show the reflectances and the transmittances of the metallic half-mirror at the image heights F1, F2, and F3, i.e., at the incident angles α1, α2, and α3.

Figure 10:
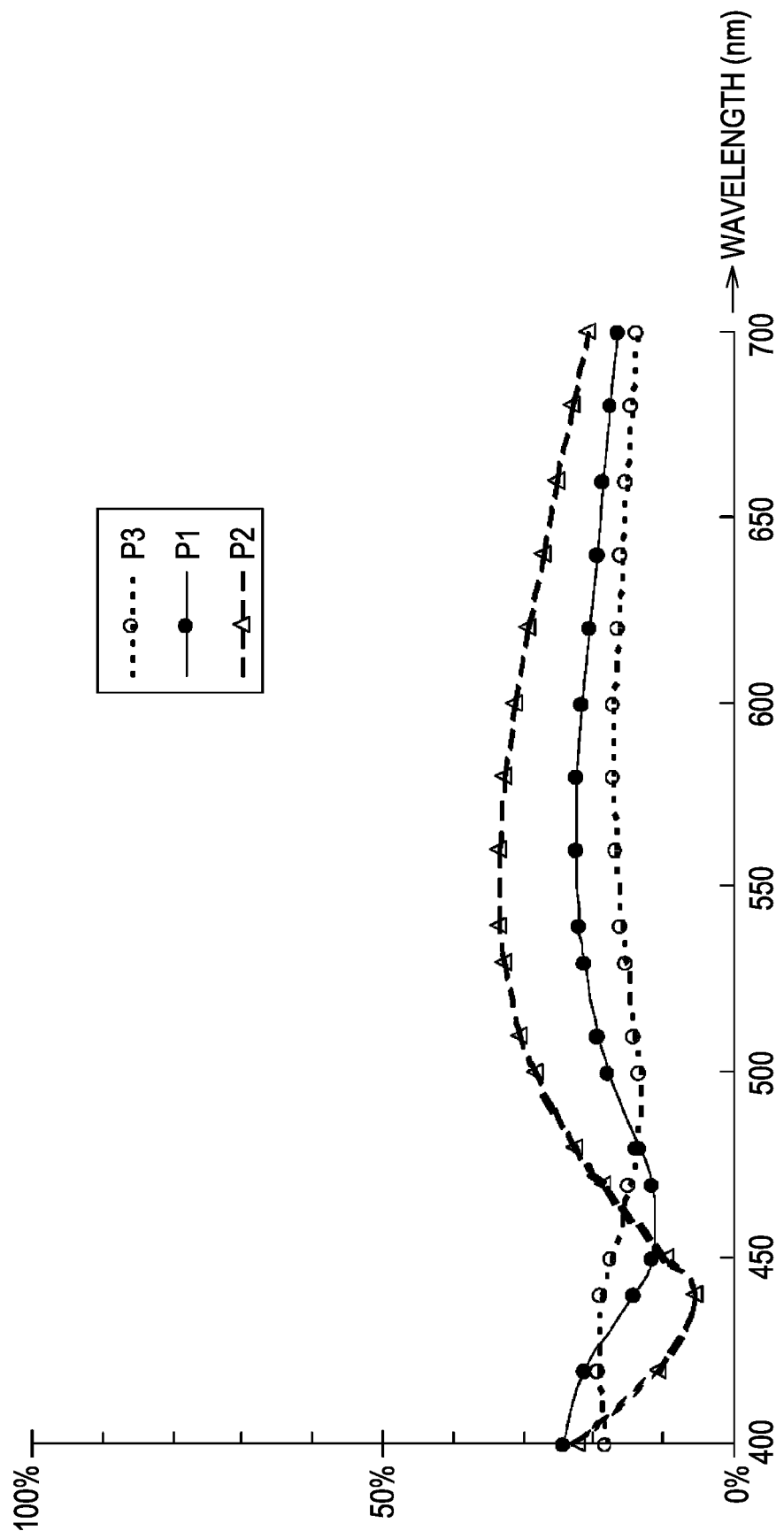
FIG. 10 shows the wavelength characteristic of a metallic half-mirror Rs×Tp.

FIG. 10 shows wavelength characteristics of the product of the reflectance Rs of the S-polarized light of the metallic half-mirror and the transmittance Tp of the P-polarized light thereof corresponding to the image heights F1, F2, and F3.

Table 1 shows the wavelength characteristics at the points F1, F2, and F3, when the half-mirror on the optical surface S19 is dielectric. For reference, the wavelength characteristics at the points F1, F2, and F3, when the half-mirror on the optical surface S19 is metallic (aluminum), are shown in Table 2.

For comparing efficiencies of the half-mirror provided on the optical surface S19 of the cylindrical lens 8, the comparison will be made with the product of the reflectance of the S-polarized light and the transmittance of the P-polarized light according to the embodiment.

Also, the comparison will be made with the value of a wavelength 550 nm for convenience sake.

In Tables 1 and 2, at the points F1, F2, and F3 and in the wavelength of 550 nm at the incident angles α1, α2, and α3, reflectances of the P-polarized light and the S-polarized light of the dielectric half-mirror are designated by Rp and Rs, respectively; transmittances thereof are designated by Tp and Ts, respectively; reflectances of the P-polarized light and the S-polarized light of the metallic half-mirror are designated by Rpm and RsM, respectively; and transmittances thereof are designated by TpM and TsM, respectively.

TABLE 1

DIELECTRIC HM

| | FIELD ANGLE | | |
|---|---|---|---|
| | F1 | F2 | F3 |
| | | ANGLE | |
| | α1 | α2 | α3 |
| | 40° | 15° | 65° |
| Rp | 39.0% | 55.2% | 10.6% |
| Rs | 65.3% | 58.5% | 82.2% |
| Tp | 61.0% | 44.8% | 89.4% |
| Ts | 34.7% | 41.5% | 17.8% |
| Rs * Tp | 39.8% | 26.2% | 73.5% |

TABLE 2

Al-HM

| | FIELD ANGLE | | |
|---|---|---|---|
| | F1 | F2 | F3 |
| | | ANGLE | |
| | α1 | α2 | α3 |
| | 40° | 15° | 65° |
| Rp | 31.8% | 31.2% | 22.4% |
| Rs | 43.5% | 31.7% | 58.7% |
| Tp | 50.5% | 50.5% | 56.9% |
| Ts | 42.6% | 50.2% | 31.6% |
| Rs * Tp | 22.0% | 16.0% | 33.4% |

From Tables 1 and 2, and FIGS. 6 and 10, it is understood that in comparison with the case using the Al half-mirror, use of the dielectric half-mirror increases the efficiency of the half-mirror provided on the optical surface S19 of the cylindrical lens 8 as follows:

at the point F1, 39.8%÷22.0% =1.8 times;

at the point F2, 26.2%÷16.0% =1.6 times; and at the point F3, 73.5%÷33.4% =2.2 times; so that the brightness of the image display apparatus can be increased.

Then, according to the embodiment, the optical surface S19 is coated with an optical film made of a dielectric ($SiO_2$, for example) so as to form a half-mirror surface.

A dielectric film is used for the optical surface S19 as light flux dividing means especially having high refractive power so as to incline the brightness distribution of the light emitting surface of the light source unit 30, enabling images with high illumination efficiency and the uniform brightness distribution to be observed.

On the other hand, as is understood from the values of Rs×Tp in Table 1, the illumination efficiency of the point F2 is lower than that of the point F1 along the axes; and that of the point F3 is higher. Consequently, the illuminance distribution of the virtual images of the image display apparatus becomes asymmetrical.

Specifically, relative to the point F1, the efficiency of the point F2 is 66%; and that of the point F3 is 185%, so that the efficiency of the point F3 is 2.8 times that of the point F2.

Then, in the light source unit 30 according to the embodiment, elements are established so that the brightness unevenness of observed images due to the difference in illumination efficiency is reduced by increasing the luminance of the point F2 in comparison with that of the point F3.

For increasing the illuminance level of the point F2 larger than that of the point F3, the diffusing plate 31 may be configured to make the brightness distribution on the diffusing plate 31 non-uniform.

According to the embodiment, the brightness distribution on the diffusing plate 31 is made non-uniform such that the brightness of the portion (Q2) of the diffusing plate 31 remote from the optical surface S19 is increased larger than that of the portion (Q3) close thereto.

According to the embodiment, the multilayer films applied on the optical surface A is configured to satisfy the following condition:

$$30\% < Rs \times Tp,$$

where the reflectance of the optical surface A when S-polarized light with a wavelength 550 nm is incident therein at an incidence angle of 40° is Rs, and the transmittance when P-polarized light is incident therein at an incidence angle of 40° is Tp.

Figure 11:
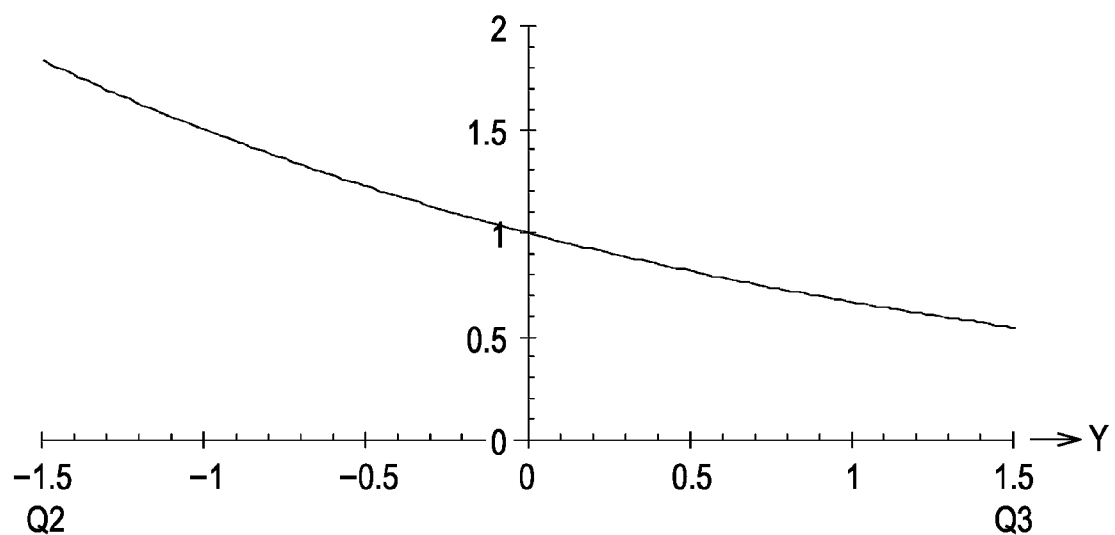
FIG. 11 is an explanatory drawing for illustrating the brightness distribution on a diffusing plate 31.

FIG. 11 shows the brightness distribution on the diffusing plate 31.

In FIG. 11, the distance from the center of the diffusing plate in the Y-direction is plotted in abscissa.

According to the embodiment, the width of the diffusing plate is about 3 mm, and the brightness is plotted in ordinate and shown by an index in that the brightness is 1 at the center (Y=0) of the diffusing plate.

The brightness levels at the points Q1, Q2, and Q3 in FIG. 2 are as shown in this drawing. That is, the components are configured so that the brightness is higher at the point Q2 corresponding to the point F2 while being lower at the point Q3 corresponding to the point F3.

Namely, on the local meridional section, the components are established so that the brightness distribution monotonously varies on the diffusing plate.

Then, the arrangement of the LEDs 33 on the LED substrate 34 constituting the light source unit 30 at this time will be described.

On the LED substrate 34, a plurality of the LEDs 33 are juxtaposed in the X-direction and a plurality of the LED arrays are arranged in the vertical direction.

According to the embodiment, as shown in FIG. 2, the diffusing plate 31 and the LED substrate 34 having the LEDs 33 arranged thereon are shifted to each other, and the points Q1 and Q2 on the diffusing plate 31 are directly illuminated with light from the LEDs 33.

Whereas, the point Q3 is mainly illuminated with the reflection light from reflection members 32 provided on sides of the light source unit 30, thereby obtaining the brightness distribution shown in FIG. 11.

Other than the shifted configuration of the diffusing plate 31 and the LED substrate 34 shown in FIG. 2, other configurations whereby the brightness distribution is inclined may be provided.

For example, an arrangement method may be incorporated in that the number of the LEDs 33 of the upper LED arrays is smaller while that of the lower LED arrays being larger. Alternatively, the intervals of the LEDs 33 of the upper LED arrays may be larger while those of the lower LED arrays being smaller.

Figure 12:
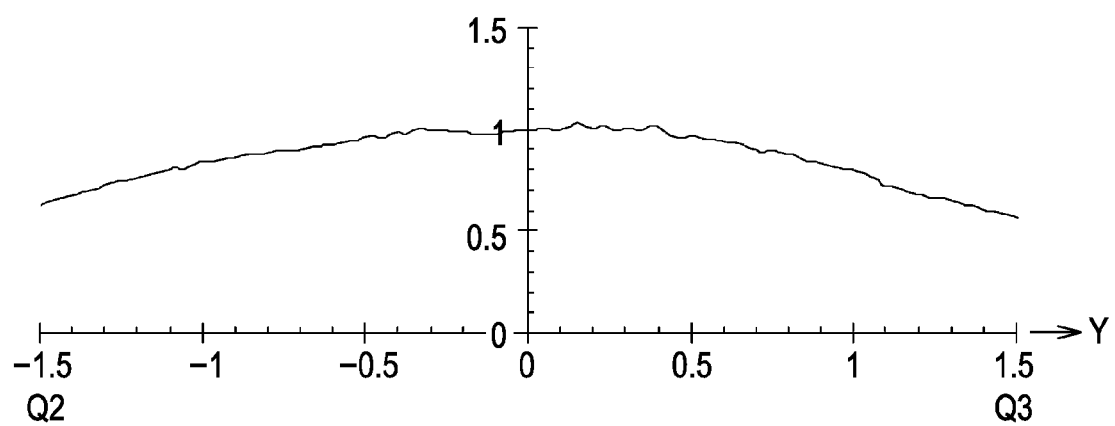
FIG. 12 is an explanatory drawing for illustrating the brightness distribution on a virtual image.

FIG. 12 shows the brightness distribution in the Y-direction on the virtual images observed at the exit pupil S1 of the image display apparatus according to the embodiment.

As shown in FIG. 12, the brightness distribution on the diffusing plate 31 is cancelled by the angular characteristics of the half-mirror on the optical surface S19, so that images with uniform brightness distribution can be observed.

According to the embodiment described above, as shown in FIG. 11, the brightness distribution on the diffusing plate 31 has inclination so as to make the brightness of the entire surface non-uniform.

Thereby, the inclination in brightness distribution of the observed images due to the half-mirror made of a dielectric is alleviated.

The dielectric films are applied on the optical surface S19 of the light flux dividing means having high refractive power, and the inclination is provided in the brightness distribution on the diffusing surface of the light source unit so as to obtain an image display apparatus capable of observing images with high light economical efficiency and the uniform brightness distribution.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-249254 filed Sep. 14, 2006, which is hereby incorporated by reference herein in its entirety.

What is claimed is:

1. An image display apparatus comprising:
   a light source unit;
   a liquid crystal display panel;
   an illumination optical system configured to lead the light from the light source unit to the liquid crystal display panel; and
   a display optical system configured to lead the light from the liquid crystal display panel to an observer,
   wherein the illumination optical system and the display optical system share an optical surface having dielectric multilayer films laminated thereon and being concave toward the liquid crystal display panel on a plane including a center ray corresponding to an angle of view, the optical surface reflecting the light from the light source unit so as to lead the reflected light to the liquid crystal display panel while transmitting the light reflected from the liquid crystal display panel, and
   wherein on the plane including the center ray corresponding to an angle of view, the brightness of a light-emitting surface of the light source unit is higher on a side remote from the optical surface than on a side close to the optical surface, and
   wherein the dielectric multilayer films laminated on the optical surface satisfy the following condition:

$$30\% < Rs \times Tp,$$

where the reflectance of the films when S-polarized light with a wavelength 550 nm is incident in the films at an incidence angle of 40° is Rs, and the transmittance of the films when P-polarized light is incident in the films at an incidence angle of 40° is Tp.

2. The apparatus according to claim 1, wherein the optical surface is arranged such that the portion of the optical surface close to the light-emitting surface of the light source unit is remote from the liquid crystal display panel in comparison with the portion of the optical surface remote from the light-emitting surface.

3. The apparatus according to claim 1, wherein the light source unit includes a light-emitting element and a diffusing plate configured as the light-emitting surface of the light source unit by the incident light from the light-emitting element.

4. The apparatus according to claim 3, wherein the light-emitting element is displaced from a correct position opposing the diffusing plate.

* * * * *